(12) United States Patent
Galbreath et al.

(10) Patent No.: US 8,197,010 B2
(45) Date of Patent: Jun. 12, 2012

(54) SEAT TRIM ASSEMBLY

(75) Inventors: Ashford A. Galbreath, Troy, MI (US);
Asad S. Ali, Troy, MI (US); Paul Severinski, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 326 days.

(21) Appl. No.: 12/574,027

(22) Filed: Oct. 6, 2009

(65) Prior Publication Data
US 2010/0117434 A1    May 13, 2010

Related U.S. Application Data

(60) Provisional application No. 61/199,003, filed on Nov. 12, 2008.

(51) Int. Cl.
*A47C 7/02* (2006.01)
(52) U.S. Cl. .................. 297/452.6; 297/218.2
(58) Field of Classification Search ............. 297/218.2, 297/452.6; 5/406, 407
See application file for complete search history.

(56) References Cited

U.S. PATENT DOCUMENTS

| | | | | |
|---|---|---|---|---|
| 3,630,572 A * | 12/1971 | Homier | | 297/452.6 |
| 3,848,926 A * | 11/1974 | Kuroishi | | 297/452.53 |
| 3,961,823 A * | 6/1976 | Caudill, Jr. | | 297/452.6 |
| 4,470,179 A | 9/1984 | Gollin et al. | | |
| 4,508,220 A | 4/1985 | Pearson | | |
| 5,320,269 A | 6/1994 | Deschenes et al. | | |
| 5,388,749 A | 2/1995 | Davignon et al. | | |
| 5,605,373 A * | 2/1997 | Wildern et al. | | 297/218.4 |
| 5,641,552 A | 6/1997 | Tillner | | |
| 5,683,025 A | 11/1997 | Grendol | | |
| 5,733,001 A * | 3/1998 | Roberts | | 297/218.1 |
| 5,820,213 A | 10/1998 | Severinski | | |
| 5,896,720 A | 4/1999 | Bond | | |
| 5,964,017 A | 10/1999 | Roberts | | |
| 5,971,478 A | 10/1999 | Hurite | | |
| 6,299,255 B1 * | 10/2001 | Pichon | | 297/452.6 |
| 6,478,209 B1 | 11/2002 | Bruins et al. | | |
| 6,568,761 B2 | 5/2003 | Perske et al. | | |
| 6,668,429 B2 | 12/2003 | Fujisawa et al. | | |
| 6,698,641 B2 | 3/2004 | Flannery et al. | | |
| 6,899,399 B2 | 5/2005 | Ali et al. | | |
| 6,964,453 B1 | 11/2005 | Flegal et al. | | |
| 7,287,305 B2 | 10/2007 | Bednarski | | |

(Continued)

FOREIGN PATENT DOCUMENTS

DE    7317520 U    3/1974

(Continued)

OTHER PUBLICATIONS

German Patent and Trademark Office, German Office Action for German Patent Application No. 10 2009 046 551.0-16 mailed Mar. 14, 2011.

*Primary Examiner* — David Dunn
*Assistant Examiner* — David E Allred
(74) *Attorney, Agent, or Firm* — Brooks Kushman P.C.

(57) ABSTRACT

A seat trim assembly including a cushion having an opening and a retention clip. The retention clip has a retention feature and a base disposed in the cushion. The base includes a pad and first and second arms extending from the pad at an angle. The retention feature extends from the pad and extending into the opening.

20 Claims, 3 Drawing Sheets

U.S. PATENT DOCUMENTS

| | | | |
|---|---|---|---|
| 7,487,575 B2 * | 2/2009 | Smith .............................. 24/297 |
| 7,506,939 B2 | 3/2009 | Brockschneider et al. |
| 7,517,577 B2 * | 4/2009 | Pedde et al. .................... 428/99 |
| 7,559,100 B2 * | 7/2009 | Pedde et al. ....................... 5/407 |
| 7,585,025 B2 * | 9/2009 | Welch et al. ............... 297/218.2 |
| 7,815,992 B2 * | 10/2010 | Pedde et al. ................. 428/100 |
| 8,099,837 B2 * | 1/2012 | Santin et al. ................... 24/297 |
| 2002/0101109 A1 * | 8/2002 | Stiller et al. ............... 297/452.6 |
| 2003/0001421 A1 | 1/2003 | Schmidt |
| 2003/0215601 A1 * | 11/2003 | Pedde et al. ................. 428/102 |
| 2005/0006944 A1 * | 1/2005 | Ali et al. .................... 297/452.6 |
| 2005/0150090 A1 | 7/2005 | Pedde et al. |
| 2006/0061192 A1 | 3/2006 | Flegal et al. |
| 2008/0048474 A1 | 2/2008 | Pedde et al. |
| 2008/0258523 A1 * | 10/2008 | Santin et al. ............... 297/218.2 |
| 2009/0085384 A1 * | 4/2009 | Galbreath et al. ......... 297/218.1 |
| 2009/0096274 A1 | 4/2009 | Pedde et al. |
| 2009/0295215 A1 * | 12/2009 | Galbreath et al. ......... 297/452.6 |

FOREIGN PATENT DOCUMENTS

| | | |
|---|---|---|
| DE | 69310593 T2 | 12/1997 |
| DE | 29821697 U1 | 3/1999 |
| DE | 29822649 U1 | 5/1999 |
| DE | 20100848 U1 | 3/2001 |
| DE | 10019798 A1 | 11/2001 |
| DE | 202004017050 U1 | 1/2005 |
| DE | 202005008952 U1 | 8/2005 |
| DE | 202005013339 U1 | 11/2005 |
| DE | 102006020306 A1 | 11/2007 |
| DE | 102007037867 A1 | 6/2008 |
| DE | 102009046551 * | 5/2010 |
| EP | 1220628 B1 | 10/2002 |
| GB | 2328708 A | 3/1999 |
| JP | 2691457 B2 | 12/1997 |
| WO | 02054917 A2 | 7/2002 |
| WO | 2008017360 A1 | 2/2008 |

* cited by examiner

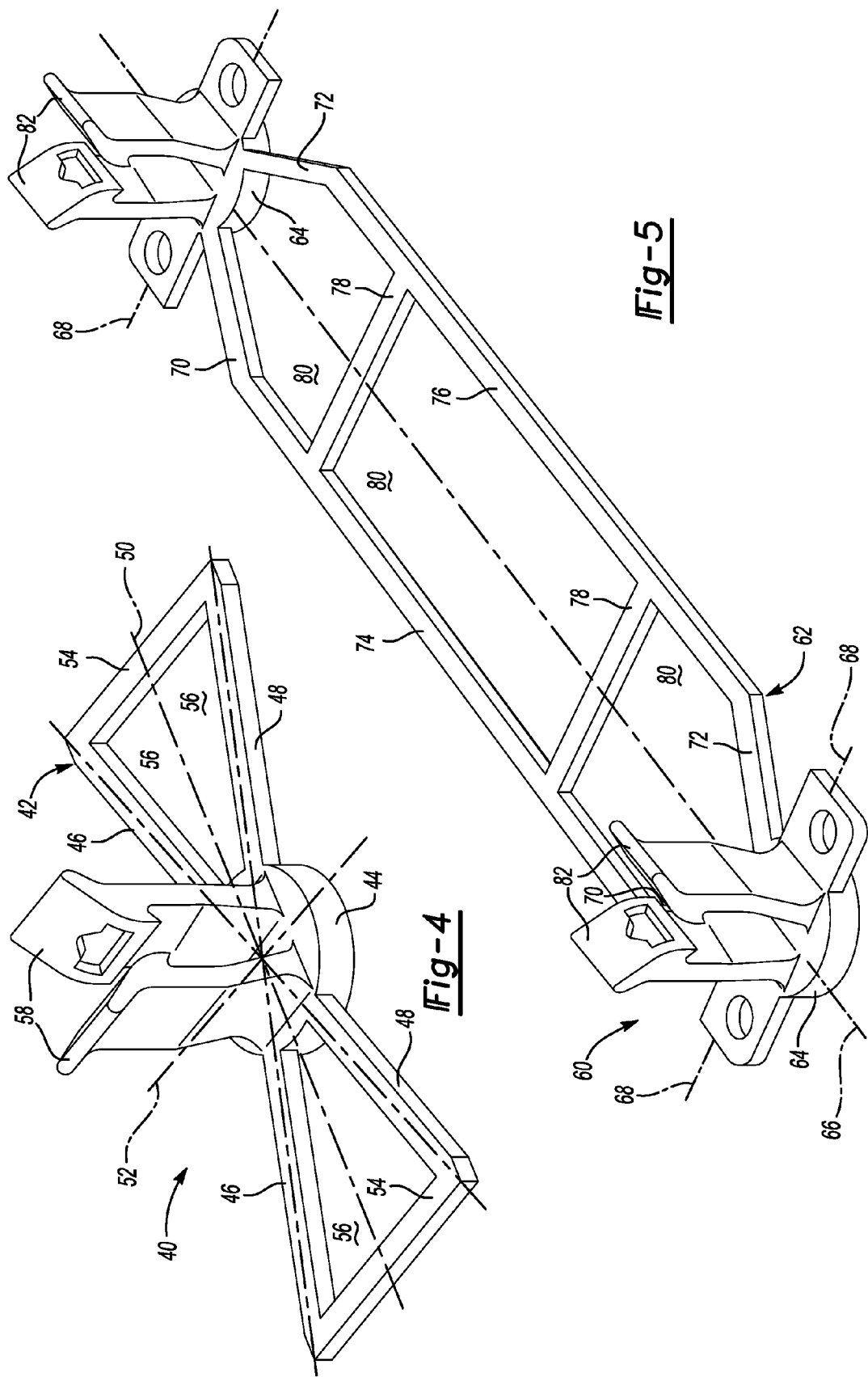

SEAT TRIM ASSEMBLY

CROSS-REFERENCE TO RELATED APPLICATIONS

This application claims the benefit of U.S. provisional application Ser. No. 61/199,003 filed Nov. 12, 2008.

BACKGROUND OF THE INVENTION

Field of the Invention

The present invention relates to a seat trim assembly that may be used to secure a trim cover.

SUMMARY OF THE INVENTION

In at least one embodiment, a seat trim assembly is provided. The seat trim assembly may include a cushion having an opening and a retention clip. The retention clip may have a base disposed in the cushion and a retention feature. The base may include a pad and first and second arms extending from the pad at an angle relative to first and second base axes. The retention feature extends from the pad and into the opening.

In at least one embodiment, a seat trim assembly is provided. The seat trim assembly includes a cushion having an opening and a retention clip. The retention clip has a base disposed in the cushion and first and second retention features. The base includes first and second pads are disposed about a center axis, first and second pairs of arms extending at an angle from the first and second pads, respectively, and first and second extension arms that extend between the first and second pairs of arms. The first and second retention features extend from the first and second pads, respectively, and into the opening.

BRIEF DESCRIPTION OF THE DRAWINGS

FIG. 4 is a perspective view of the retention clip shown in FIG. 2.

FIG. 5 is a perspective view of another embodiment of a retention clip.

DETAILED DESCRIPTION

Figure 1:
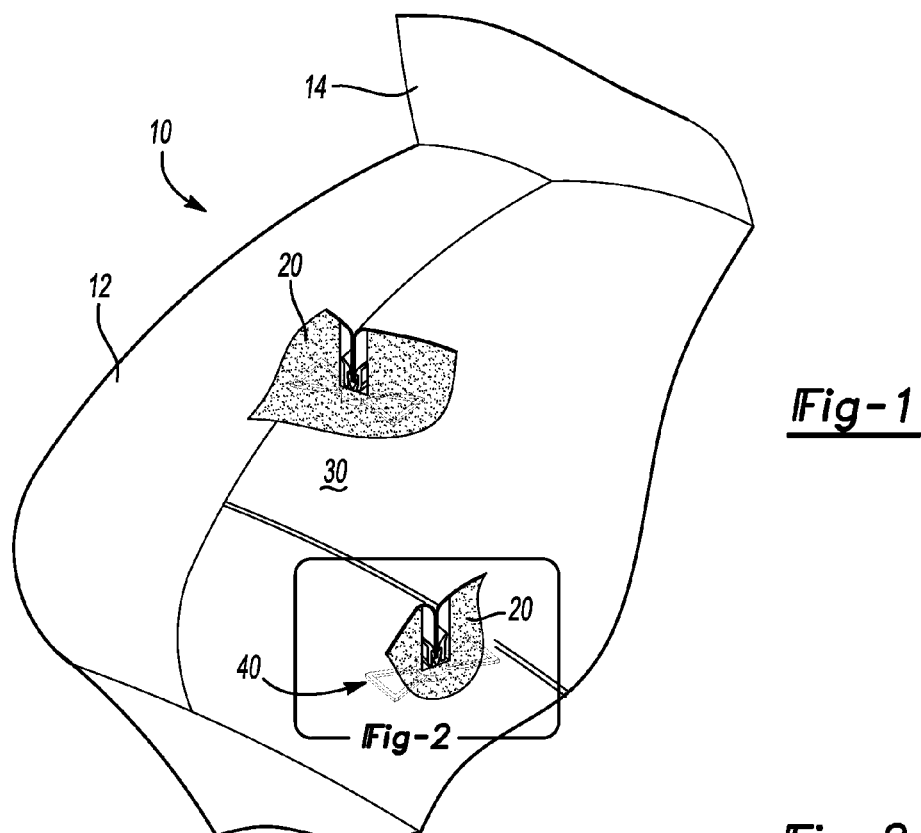
FIG. 1 is a fragmentary perspective view of a portion of a seat assembly.
Figure 2:
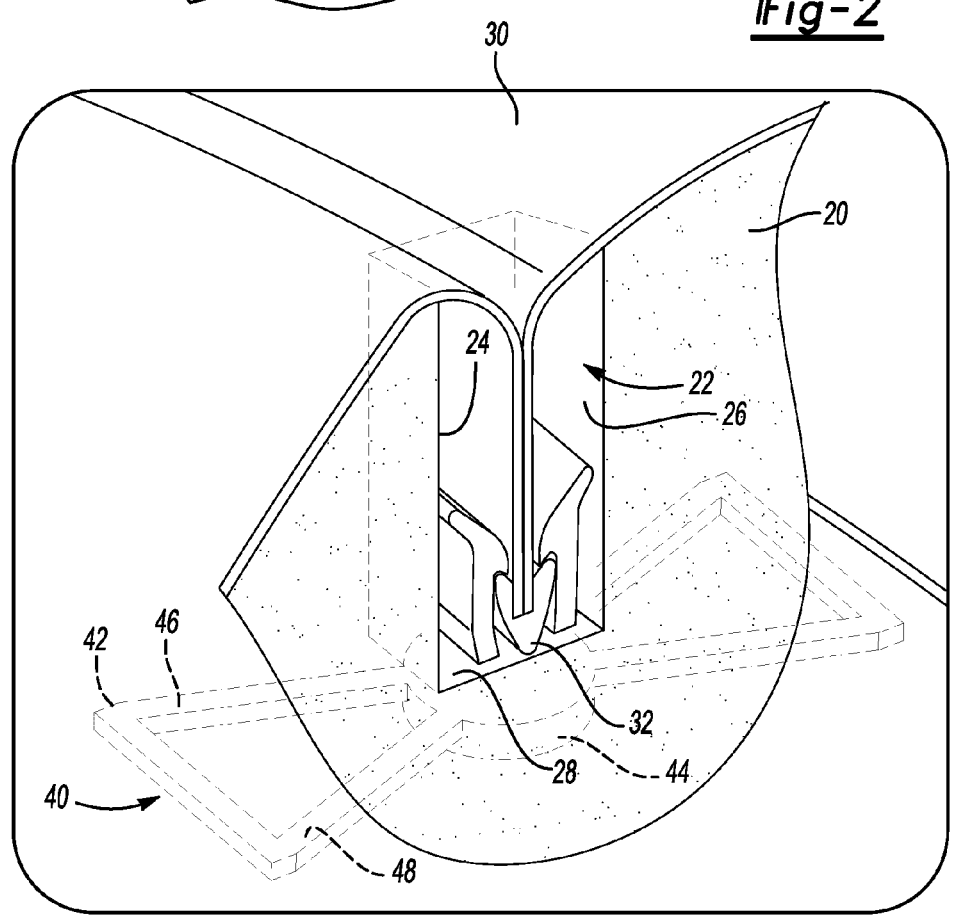
FIG. 2 is a magnified section view of the seat assembly having a trim cover assembly and a retention clip.

Referring to FIGS. 1 and 2, a portion of a seat assembly 10 is shown. The seat assembly 10 may be provided with a vehicle, such as a car or truck. In addition, the seat assembly 10 may be configured for non-vehicular applications.

The seat assembly 10 may include a seat bottom 12 and a seat back 14. In a vehicular application, the seat bottom 12 may be moveably disposed on a support surface. The seat back 14 may be pivotally disposed on the seat bottom 12 in a manner known by those skilled in the art. The seat bottom 12 and the seat back 14 may include a support structure, such as a seat frame, seat pan, and/or support wires.

A cushion 20 may be supported by the support structure. The cushion 20 may be made of any suitable material, such as foam. The cushion 20 may include at least one opening 22. The opening 22 may be a recess, such as a hole, trench, or elongated channel, that is provided in the cushion 20. The opening 22 may be at least partially defined by a plurality of surfaces. For instance, the opening 22 may be at least partially defined by first and second side surfaces 24, 26 and a bottom surface 28 that extends between the first and second side surfaces 24, 26 as is best shown in FIG. 2.

At least one trim cover assembly 30 may be provided with the seat assembly 10. The trim cover assembly 30 may be disposed over the cushion 20 and may comprise an exterior surface of the seat assembly 10 upon which a seat occupant may be disposed when in a seated position. The trim cover assembly 30 may include one or more trim panels that may be made of any suitable material, such as fabric, leather, vinyl, or combinations thereof.

The trim cover assembly 30 may also include at least one engagement feature 32. The engagement feature 32 may help secure the trim cover assembly 30 to the seat assembly 10 to hold the trim cover assembly 30 in a desired position and to inhibit folding, puckering, or wrinkling of the trim cover assembly 30 that may have an undesirable aesthetic appearance. The engagement feature 32 may have any suitable configuration, such as a male configuration, female configuration, or combinations thereof. In addition, the engagement feature 32 may be provided in any suitable location. For example, the engagement feature 32 may be provided proximate an end of one or more trim cover panels. The engagement feature 32 may be coupled to the trim cover assembly 30 in any suitable manner, such as with stitching or an adhesive. Moreover, the engagement feature 32 may be made of any suitable material, such as a polymeric material.

Figure 3:
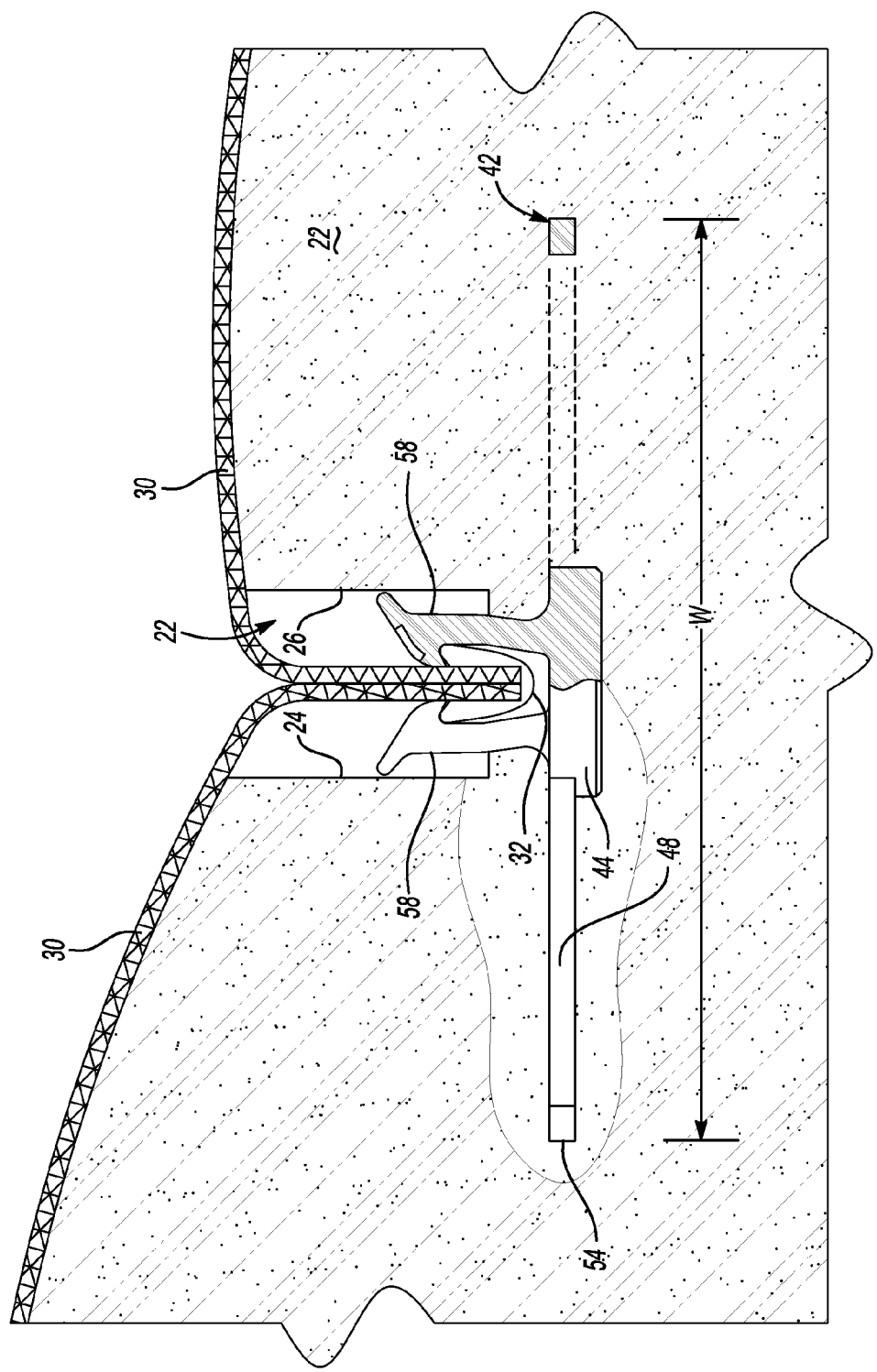
FIG. 3 is a fragmentary side section view of the retention clip shown in FIG. 2.

Referring to FIGS. 2-4, the seat assembly 10 may also include at least one retention clip 40. The retention clip 40 may be configured to engage one or more engagement features 32 to provide localized retention of the trim cover assembly 30. The retention clip 40 may be partially disposed in the cushion 20 and partially disposed in the opening 22 as will be discussed in more detail below.

The retention clip 40 may include a base 42. The base 42 may act as a footing and may be disposed in the cushion 20 and spaced apart from the opening 22. As such, the base 42 may distribute load forces and provide sufficient surface area to enhance bonding to the cushion 20 to inhibit dislocation or removal of the retention clip 40 from the cushion 20. The base 42 may include a pad 44 and first and second arms 46, 48 that extend from the pad 44. The first and second arms 46, 48 may be generally linear and may be disposed substantially coplanar with the pad 44. In addition, the first and second arms 46, 48 may be provided in pairs that may be provided on opposite sides of the pad 44. The first and second arms 46, 48 may be spaced apart from each other.

The first and second arms 46, 48 may be provided at an angle, such as an acute angle, with respect to each other. In addition, the first and second arms 46, 48 may be provided at an angle with respect to first and second base axes 50, 52. The first and second base axes 50, 52 may be provided in a coplanar perpendicular relationship and may intersect at substantially the center of the pad 44. As such, the first and second base axes 50, 52 may substantially bisect the pad 44. In addition, the first and second arms 46, 48 may be oriented along axes that intersect at a point, such as at or near the center of the pad 44.

The first and second arms 46, 48 may be provided such that the base 42 is wider than the opening 22 in the cushion 20. For example, the base 42 may be provided with a width W that is greater than the width or distance between the first and second side surfaces 24, 26 of the opening 22 as is best shown in FIG. 3.

A connecting member 54 may extend between the first and second arms 46, 48. In at least one embodiment, the connecting member 54 may be provided at distal ends of the first and second arms 46, 48. The connecting member 54 may be substantially linear, spaced apart from the pad 44, and disposed substantially coplanar with the first and second arms 46, 48. The connecting member 54 may help provide structural reinforcement and generally maintain the positioning of the first and second arms 46, 48 with respect to each other. In addition, the connecting member 54 may cooperate with the first and second arms 46, 48 to at least partially define a base opening 56 that may provide access for insertion of a tool through the retention clip 40 to engage and pull the trim cover assembly 30 toward and into engagement with the retention clip 40. As such, a majority of the base 42 of the retention clip 40 may be spaced apart from the first base axis 50.

One or more retention features 58 may be provided with the retention clip 40. The retention feature 58 may have any suitable configuration. In the embodiment shown, the retention feature 58 is configured as a pair of spaced apart barbs that extend from the pad 44. The barbs may be configured to flex away from each other to receive the engagement feature 32 in a snap-fit arrangement. The retention feature 58 may extend through the cushion 20 and into the opening 22 as is best shown in FIG. 3.

Referring to FIG. 5, another embodiment of a retention clip 60 is shown. The retention clip 60 may include a base 62 that may be disposed in the cushion 20. As with the previous embodiment, the base 62 may act as a footing and may be provided with a width that is greater than the width or distance between the first and second surfaces 24, 26 of the opening 22.

The base 62 may include a plurality of pads 64 disposed along a first base axis 66. A second base axis 68 may be coplanar with and extend substantially perpendicular to the first base axis 66. First and second arms 70, 72 may extend from each pad 64. The first and second arms 70, 72 may be provided at an angle with respect to each other and with respect to the first base axis 66. The first and second arms 70, 72 may be oriented along axes that intersect at a point, such as at or near the center of a respective pad 64. In addition, the first and second arms 70, 72 may be substantially linear and spaced apart from each other.

First and second extension arms 74, 76 may also be provided with the base 62. The first extension arm 74 may extend between the first arms 70. The second extension arm 76 may extend between the second arms 72. The first and second extension arms 74, 76 may be substantially linear and may be substantially coplanar with the first and second arms 70, 72. In addition, the first and second extension arms 74, 76 may extend substantially parallel to each other and to the first base axis 66.

At least one connecting member 78 may extend between the first and second extension arms 74, 76 to provide structural reinforcement and generally maintain the positioning of the first and second extension arms 74, 76 with respect to each other. The connecting member 78 may be substantially linear and may intersect the first base axis 66 while being disposed substantially parallel to the second base axis 68. In addition, the connecting member 78 may cooperate with the first and second extension arms 74, 76 to at least partially define multiple base openings 80 that may provide access for insertion of a tool through the retention clip 60 to engage and pull the trim cover assembly 30 into engagement with the retention clip 60. In at least one embodiment, the base openings 80 may be disposed along and substantially centered on or bisected by the first base axis 66. As such, a majority of the base 62 of the retention clip 60 is spaced apart from the first base axis 66.

One or more retention features 82 may be provided with the retention clip 60. The retention feature 82 may have any suitable configuration. In the embodiment shown, the retention feature 82 is configured as a pair of barbs that extend from the pad 64. The barbs may be configured to flex away from each other to receive the engagement feature 32. The retention feature 82 may extend through the cushion 20 and into the opening 22. In the embodiment shown, the retention features are provided on opposite sides of first base axis 66.

The retention clip 40, 60 may be provided with the cushion 20 during the cushion molding process. For example, the retention clips 40, 60 may be positioned in a mold and the cushion material may be injected, molded, and cured around the retention clip 40, 60 to secure the retention clip 40, 60 in a predetermined location in the cushion 20. In addition, a plurality of retention clips 40, 60 may be interconnected or provided as a strip that may be separated into individual clips or a series of clips having a desired quantity or length.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat trim assembly comprising:
   a cushion having a cushion opening; and
   a retention clip including:
   a base disposed in the cushion, the base including:
   first and second pads that are spaced apart from each other and disposed on a first base axis each of the first and second pads having a portion devoid of a pad opening, wherein the portion has a width that is wider than the cushion opening;
   first and second arms that are connected to and extend from the first pad;
   third and fourth arms that are connected to and extend from the second pad;
   a first extension arm that connects the first arm to the third arm; and
   a second extension arm that connects the second arm to the fourth arm wherein the first, second, third, and fourth arms and the first and second extension arms at least partially define at least one base opening therebetween on the first base axis; and
   a retention feature extending from each of the pads and into the opening cushion.

2. The seat trim assembly of claim 1 further comprising a trim cover assembly disposed over the cushion, wherein the retention feature engages the trim cover assembly to secure the trim cover assembly.

3. The seat trim assembly of claim 1 wherein the base is wider than the opening.

4. The seat trim assembly of claim 1 wherein the first and second arms are substantially coplanar with the first pad.

5. The seat trim assembly of claim 1 further comprising a first connecting member extending from a first distal end of the first arm to a second distal end of the second arm.

6. The seat trim assembly of claim 1 further comprising a second base axis that extends perpendicularly from the first base axis, wherein the first and second arms are spaced apart from the first and second base axes.

7. The seat trim assembly of claim 6 wherein the first and second arms are disposed along axes that intersect in the first pad.

8. The seat trim assembly of claim 1 wherein the first and second extension arms are spaced apart from the first base axis.

9. The seat trim assembly of claim 8 wherein the first and second extension arms are disposed substantially parallel to each other.

10. The seat trim assembly of claim 8 wherein the first and second extension arms are disposed substantially parallel to the first base axis.

11. The seat trim assembly of claim 8 further comprising a first connecting member extending between the first and second extension arms.

12. The seat trim assembly of claim 11 wherein the first connecting member intersects the first base axis and is disposed substantially parallel to the second base axis.

13. The seat trim assembly of claim 5 further comprising a second connecting member extending from a first distal end of the third arm to a second distal end of the fourth arm.

14. A seat trim assembly comprising:
a cushion having a cushion opening; and
a retention clip including:
   a base disposed in the cushion, the base including:
      first and second pads, wherein the first and second pads are disposed on a center axis each of the first and second pads having a portion devoid of a pad opening, wherein the portion has a width that is wider than the cushion opening;
      first and second pairs of arms connected to and extending from the first and second pads, respectively, and at an angle relative to the center axis; and
      first and second extension arms that connect the first and second pairs of arms wherein the first and second pairs of arms and the first and second extension arms at least partially define at least one base opening therebetween on the center axis; and
   first and second retention features extending from the first and second pads, respectively, and into the cushion opening.

15. The seat trim assembly of claim 14 wherein the first and second extension arms are spaced apart from the center axis.

16. The seat trim assembly of claim 14 wherein the first and second pads, first and second pairs of arms, and first and second extension arms are substantially coplanar.

17. The seat trim assembly of claim 14 further comprising a first connecting member extending between the first and second extension arms.

18. The seat trim assembly of claim 17 further comprising a second connecting member disposed substantially parallel to the first connecting member, wherein the first and second connecting members each at least partially define at least two openings in the base.

19. The seat trim assembly of claim 14 wherein the first and second retention features each have first and second barbs, respectively, wherein the first and second barbs are disposed on opposite sides of the center axis.

20. The seat trim assembly of claim 14 wherein the opening in the cushion further comprises first and second side walls, wherein the base extends outwardly past the first and second side walls.

* * * * *